(12) United States Patent
Das et al.

(10) Patent No.: US 11,977,773 B2
(45) Date of Patent: May 7, 2024

(54) VALIDITY TABLE FOR SOLID STATE DRIVES

(71) Applicant: Kioxia Corporation, Tokyo (JP)

(72) Inventors: Saswati Das, Milpitas, CA (US); Manish Kadam, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/491,156

(22) Filed: Sep. 30, 2021

(65) Prior Publication Data
US 2023/0096420 A1   Mar. 30, 2023

(51) Int. Cl.
G06F 3/06 (2006.01)
G06F 12/02 (2006.01)

(52) U.S. Cl.
CPC .......... G06F 3/0659 (2013.01); G06F 3/0619 (2013.01); G06F 3/0679 (2013.01); G06F 12/0238 (2013.01); G06F 12/0253 (2013.01)

(58) Field of Classification Search
CPC .... G06F 3/0659; G06F 3/0619; G06F 3/0679; G06F 12/0238; G06F 12/0253
See application file for complete search history.

(56) References Cited

U.S. PATENT DOCUMENTS

| | | | |
|---|---|---|---|
| 11,334,273 B1* | 5/2022 | Ko | G06F 3/061 |
| 11,397,672 B2 | 7/2022 | Ju et al. | |
| 2015/0074335 A1* | 3/2015 | Matsudaira | G06F 12/0246 |
| | | | 711/103 |
| 2018/0203637 A1 | 7/2018 | Furuya | |
| 2021/0224002 A1 | 7/2021 | Zhou et al. | |

OTHER PUBLICATIONS

M. Ramakrishna, Jisung Kim, Woohyong Lee and Youngki Chung, "Smart dynamic memory allocator for embedded systems," 2008 23rd International Symposium on Computer and Information Sciences, Istanbul, Turkey, 2008, pp. 1-6, doi: 10.1109/ISCIS .2008. 4717922. (Year: 2008).

* cited by examiner

Primary Examiner — Francisco A Grullon
(74) Attorney, Agent, or Firm — Foley & Lardner LLP (57) ABSTRACT

A method performed by a controller of a solid-state drive (SSD) comprising splitting a logical to physical mapping table in a non-volatile semiconductor memory device of the SSD into a plurality of regions, each of the regions associated with a plurality of logical cluster addresses (LCAs), determining if the mapping table for each region contains an entry with a valid address, setting a validity status in a validity bit for a region of the plurality of regions if the mapping table for the region contains any mapped addresses, and storing the validity bit for each region in a validity bitmap table (VBT).

28 Claims, 6 Drawing Sheets

VALIDITY TABLE FOR SOLID STATE DRIVES

FIELD

The present disclosure relates to solid-state drives (SSD) and methods that use a validity table to decrease write amplification of the SSD during operations involving workloads containing deallocate or format commands.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A controller is used in an SSD to manage the transfer of data between a host and the memory cells of the SSD. Writing data to and reading data from the physical memory cells of an SSD typically involves transferring data between a host external to the SSD and the nonvolatile semiconductor storage devices.

SSDs are subject to large volumes of data traffic as they receive multiple read and write requests from the host. SSDs store data at a physical address in the non-volatile memory referred to by one or more logical addresses (for example, LBAs) by the host and the SSD controller. The SSD controller identifies groupings of data of a particular size as data clusters (for example, a number of logical blocks). An LBA received from the host can be converted by the controller to a logical cluster address (LCA) referring to a cluster of data in the non-volatile memory that, in turn, corresponds to a physical media cluster address (MCA) on the memory device. Typically the SSD controller divides the MCA-LCA mapping table into regions for better management, where each region addresses a chunk of user data (e.g. 256 KB or 64 LCA, where each LCA addresses 4 KB of user data). The mapping table for an SSD is very large, approximately 1/1000th of the capacity of the SSD, and is stored in the non-volatile semiconductor storage device. For example, a 1 GB mapping table would be required to manage a 1 TB drive, a 2 GB mapping table would be required to manage a 2 TB drive, a 4 GB mapping table would be required to manage a 4 TB drive, and a 16 GB mapping table would be required to manage a 16 TB drive. In order for the SSD to convert a logical address to a physical address when processing a host request, the mapping table is loaded into volatile memory within the SSD for fast access.

Read and write commands from the host, as well as internal processing within the SSD (such as garbage collection, power loss protection (PLP) activities) may result in changes to the addresses stored in the mapping table. The SSD cache updates the mapping table in the volatile memory during processing of a host request. The entire updated mapping table is then written to the non-volatile semiconductor storage device periodically so that the changes in the mapping table are saved before power to the volatile memory is lost. However due to the large size of the mapping table, such updates may lead to increased latency of the SSD due to the writing of large amounts of data from the volatile to the non-volatile semiconductor storage device. Additionally, repeated deallocation of entries in the mapping table will lead to repeated writing of unmapped data to the non-volatile semiconductor storage device leading to increased write amplification of the SSD. Other processes such as garbage collection, journaling, and flushing, that routinely occur within the SSD will also require updates to the mapping table. If such updates are not stored in the non-volatile semiconductor storage device before power is lost, updated address information may be lost, leading to errors and possibly failure of the SSD. This imposes a challenge on how to efficiently manage updates of a logical-to-physical mapping table in the non-volatile semiconductor storage device.

SUMMARY

According to an embodiment of the present disclosure there is provided a method performed by a controller of a solid-state drive (SSD) comprising splitting a logical to physical mapping table in a non-volatile semiconductor memory device of the SSD into a plurality of regions, each of the regions associated with a plurality of logical cluster addresses (LCAs), determining if the mapping table for each region contains an entry with a valid address, setting a validity status in a validity bit for a region of the plurality of regions if the mapping table for the region contains any mapped addresses, and storing the validity bit for each region in a validity bitmap table (VBT) in a volatile semiconductor memory device of the SSD. The VBT may eventually be stored in the non-volatile memory during period flushing of the mapping table with related metadata.

According to another embodiment of the present disclosure, there is provided a solid-state drive (SSD) comprising a non-volatile semiconductor memory device configured to store a logical to physical mapping table, a volatile semiconductor memory device configured to store a validity bitmap table (VBT), and a controller coupled to the non-volatile semiconductor memory device and the volatile semiconductor memory device. The controller configured to split the logical to physical mapping table into a plurality of regions, each of the regions associated with a plurality of logical cluster addresses (LCAs), determine if the mapping table for each region contains an entry with a valid address, set a validity status in a validity bit for a region of the plurality of regions if the mapping table for the region contains any mapped addresses, and store the validity bit for each region in the VBT in a volatile semiconductor memory device of the SSD. The VBT may eventually be stored in the non-volatile memory during period flushing of the mapping table with related metadata.

In some implementations, the method further comprises associating a physical address with the mapping table for each region, storing the physical address for each region in a mapping region address table (MRAT), and storing the MRAT in the non-volatile semiconductor memory device. In certain implementations, the method further comprises storing a physical address for the validity bit for each region in a validity bitmap address table (VBAT), and storing the VBAT in the non-volatile semiconductor memory device. In other implementations, the validity status of the validity bit is a single-bit status. In some implementations, setting the validity status comprises clearing the bit to '0' if a region is completely unmapped, or setting the bit to '1' if a region contains at least one valid addresses. In certain implementations, the unmapped address is assigned a predetermined value.

In other implementations, the method further comprises determining the validity status for a region from the VBT, and storing the mapping table for the region in the non-volatile semiconductor memory device if the region contains valid addresses. In some implementations, the method further comprises updating the validity status for the plurality of regions in the non-volatile semiconductor memory device in response to any one of a write command, a deallocation command, a garbage collection command, and updating the corresponding validity status for each region in the VBT. In certain implementations, the method further comprises, in response to a boot up command, loading the VBAT and MRAT from the non-volatile semiconductor device, determining the validity status of the plurality of regions from the VBT, and loading to the volatile memory using the MRAT, the mapping tables for the regions containing valid addresses.

In certain implementations, the method further comprises, in response to unsafe shutdown or loss of power, loading a last saved version of the MRAT from the non-volatile semiconductor memory device, loading current version of the VBT from the volatile semiconductor memory device, comparing the validity status of the plurality of regions in the current version of the VBT with the validity status of the plurality of regions in the last saved version of the mapping tables from the MRAT, and updating an valid region address in the MRAT to correspond with the validity status of the plurality of regions from the current version of the VBT. In some implementations the non-volatile semiconductor memory device is a NAND semiconductor memory. In certain implementations, the volatile semiconductor memory device is a Dynamic Random Access Memory (DRAM).

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having a similar need to efficiently update a look-up table stored in the semiconductor storage device of the SSD when processing commands from a host.

Hitherto, the non-volatile memory of the SSD (e.g. NAND flash memory devices) stores a logical cluster address (LCA) to a media cluster address (MCA) mapping table in regions. Each entry in the mapping table includes a MCA which corresponds to a translation between an LCA and an MCA, and when data at an LCA is over-written with new data by the host, the new data is written to a new MCA, necessitating an update to the corresponding mapping table entry. Additionally, when data is no longer required in the non-volatile memory, the host issues a deallocate command to the corresponding LBA range. In response controller deallocates the relevant entry in the mapping table where an invalid signature address is stored. During processing of host commands, if the corresponding mapping table region is not already loaded as part of background table loading, the SSD controller loads the LCA-MCA mapping table stored in the non-volatile memory of the SSD to a volatile memory in the SSD (e.g. Dynamic Random Access Memory (DRAM)) for quick access by the cache (e.g. Static Random Access Memory (SRAM)). Each read access to the LCA-MCA mapping table in the volatile memory comprises a DRAM burst of data which is temporarily stored in a cache.

After being updated by the controller, any updates to entries in the LCA-MCA mapping table in the DRAM are subsequently flushed back to the NAND memory so that the updated LCA-MCA mapping table will be available should power be cut from the SSD (where the DRAM and SRAM will lose data). In order to limit the amount of data flushed per update, the flushes are conducted on a per-region basis, where a region consisting of a group of 32, 64 or 128 LCA-MCA entries (which may be configurable and dependent on the total storage size of the SSD) is flushed at any one time. During the flush of data from the DRAM to the NAND memory, entire regions containing updates are copied over to the NAND memory for update. Such operations may involve the transfer of large mapping tables that contain valid and invalid entries between the DRAM and NAND memory which will leads to write amplification, an increase in latency, a decrease in sequential and random write performance in workloads involving deallocate or format processes. Further, since invalid or unmapped entries are being saved to the NAND memory, the entire mapping table will have to be restored each time during boot up (or PLP boot as the case may be) leading to an increase in time to ready and more time to achieve full throughput.

The present disclosure addresses the aforementioned issues by using a validity bitmap table (VBT) in the operation of the SSD. The purpose of the VBT is to indicate the unmapped status of the regions of the mapping table. The mapping table is initialized to invalid MCAs during boot and subsequently actual regions are loaded from NAND as part of background table loading. According to the present disclosure, the mapping table is divided into regions of 256 bytes each where a validity bit is assigned to each region in the VBT. The validity bitmap comprises a single bit that is cleared to '0' to indicate that the mapping table region is completely unmapped and contains no valid MCA. The bit is set to '1' to indicate that the mapping table region contains at least one valid MCA, i.e. the bit is set when there is at least one MCA in the mapping table region pointing to a NAND device location containing user data. During regular mapping table saving and flush, only mapping table regions corresponding to dirty or set VBT entries are saved to the NAND memory. This significantly reduces the write amplification since the VBT is a very small table compared to the sized of the LCA-MCA mapping table (1 bit versus 256 bytes to represent a region of the mapping table).

Figure 1:
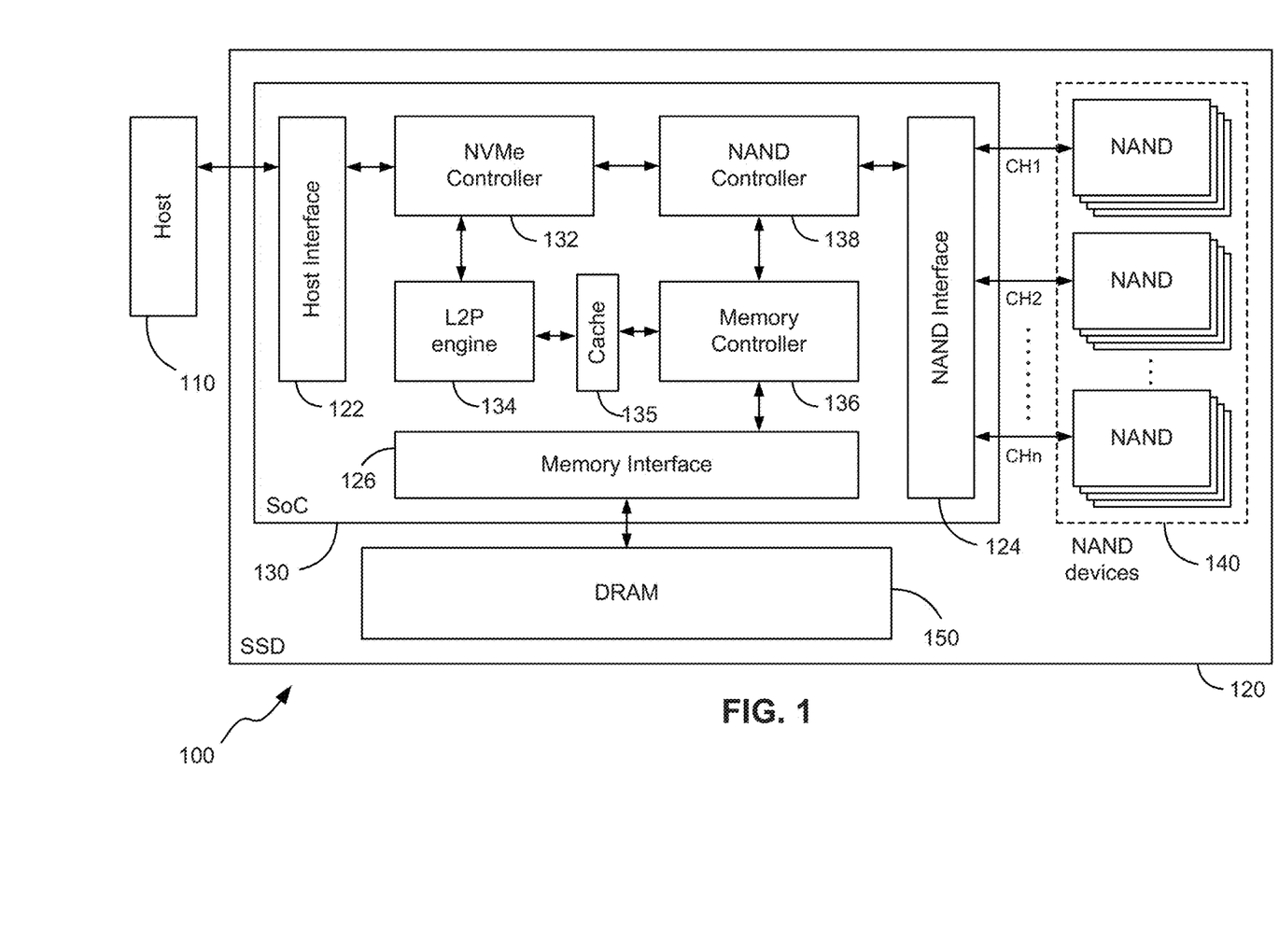
FIG. 1 shows a schematic representation of an SSD, configured according to one or more embodiments of the present disclosure.

FIG. 1 is a block diagram of a computing system 100 comprising at least one host 110 in communication with a solid-state device (SSD) 120, according to an embodiment of the present disclosure. The host 110 is a computing system that comprises processors or cores, a controller, a memory, and other components as is generally known in the art, and which are not shown in FIG. 1 for the sake of brevity. SSD 120 provides non-volatile storage functionality for use by the host 110. SSD 120 may include an integrated circuit comprising a controller. Such an integrated circuit may also be referred to as a system-on-chip (SoC) controller 130. SoCs are advantageous in SSDs as they provide a single integrated circuit that contains all the required circuitry and components of the electronic system required for the SSD to function. The SoC therefore eliminates the need for a modular discrete component architecture connected by a plurality of busses and buffers.

SoC controller 130 is communicatively coupled to a storage array of non-volatile semiconductor-based storage devices 140 (such as NAND-based flash memory devices) as the storage medium. The storage medium may comprise a plurality of NAND devices, such as, for example, 32, 64, 128, 256 separate NAND devices, and each NAND device can be running separate commands on individual dies (not shown) within the device. As an example, the storage array 140 comprising n NAND devices each with d dies may be servicing up to (n×d) commands from the SoC controller 130 at any one time, where n and d are integers greater than zero. SSD 120 also includes a volatile memory external to the SoC controller 130, such as a dynamic random access memory ("DRAM") 150. DRAM 150 comprises several buffers (not shown) used to buffer data during read and write operations between the host 110 and the storage devices 140 upon receipt of commands from the host 110.

Volatile memories are used in connection with the controller as they are fast and responsive. However, the contents stored in volatile memories are lost when power is removed. Volatile memories are also expensive, and thus increase the overall cost of the SSD. In some implementations, the whole or a part of the external memory DRAM 150 may be located within the SoC controller 130. When located within the SoC controller 130, at least a portion of the external memory may be implemented using a fast memory technology, such as static random access memory (SRAM). In some implementations, the portion of the DRAM located within the SoC 130 may be implemented as a cache 135. In certain implementations, the whole or a part of the external memory may be implemented using a fast non-volatile memory technology, including, but not limited to, magnetic random access memory (MRAM), resistive random access memory (ReRAM) or phase change memory (PCM).

SoC controller 130 comprises a host interface 122 which enables communication with the host 110 for the receipt of commands such as read, write and deallocate requests, for example. SoC controller 130 also includes a NAND interface 124 for communication with the storage elements 140 (through a plurality of channels such as NAND channels CH1, CH2 . . . CHn as shown in FIG. 1, where n is an integer), and a memory interface 126 for communication with the memory 150 external to the SoC. Host interface 122 on the SoC 130 may comprise a Serial Advanced Technology Attachment (SATA) connector or a NVMe™ connector (NVMe™ is an acronym for "NVM express," where "NVM" stands for non-volatile memory, hereinafter NVMe) operating with a PCIe® ("Peripheral Component Interface Express," hereinafter PCIe) bus, for example. NAND interface 124 may comprise an Open NAND Flash Interface (ONFI), a toggle NAND interface or a manufacturer's proprietary interface, for example. Memory interface 126 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

SoC controller 130 may comprise various internal sub-controllers such as an NVMe controller 132 coupled to the host interface 122, a memory controller 136 coupled to the memory interface 126 via a cache 135, and a NAND controller 138 coupled to the NAND interface 124. The NVMe controller 132 may be configured to function in accordance with the NVM Express™ Base Specification (version 1.4) dated Jun. 10, 2019, hereinafter referenced as "NVMe 1.4." The NVMe controller 132, L2P engine 134, NAND controller 138 and Memory Controller 136 are interconnected by a common bus and controlled by a control and configuration function (not shown) of the SoC controller 130, which configures and controls the operation and the passing of data between these controllers 132, 136, 138. Memory controller 136 is connected to the DRAM 150 via the memory interface 126. Memory controller 136 is also coupled to the NVMe Controller 132, NAND controller 138 and to the L2P engine via the cache 135. NAND controller 138 is connected to the NAND interface 124 for communication with the storage elements 140, as is shown in FIG. 1. Thus any interaction between the DRAM 150 and the NAND storage elements 140 occurs via the memory interface 126, cache 135, the memory controller 136, the NAND controller 138 and the NAND interface 124. Additionally memory controller 136 is in communication with the NVMe controller 132 and a logical-to-physical (L2P) engine 134, as shown in FIG. 1, and described below. In some implementations, the L2P engine 134 is also implemented in the control and configuration function of the SoC controller 130.

The control and configuration function may comprise application specific integrated circuit (ASIC) logic that is programmable, programmable firmware running on one or more processors or a combination of both. The control and configuration function may comprise a logical-to-physical (L2P) engine 134 that translates logical address information specified in a command received from the host 110 into physical address information related to the NAND memory 140. The control and configuration function may comprise a flash translation layer that enables the SoC controller 130 to perform various activities that facilitate the processing of read and write commands received from the host 110. One such activity may include the orchestration of the data flow for the commands between the NVMe controller 132 and the NAND controller 138.

Once the NVMe controller 132 receives commands from the host 110, such as read commands or write commands, for example, the L2P engine 134 in the control and configuration function maps the logical block addresses contained in the host commands to physical NAND addresses. The L2P engine 134 may utilize a look-up table contained in the cache 135 and/or the DRAM 150 to obtain the required NAND addresses. These NAND addresses are then used in NAND commands, either based on the host commands received or internally generated by firmware, which are sent to the NAND controller 138. The NAND controller 138 uses the NAND addresses to then perform an action or function on the memory device 140, as defined by the host or internal command. For example if the host command is a read command, the NAND controller 138 retrieves data from the specified NAND address in the memory 140, where multiple NAND read commands may be issued to the NAND controller 138 in order to retrieve the data. As another example, if the host command is a write command, the NAND controller 138 causes the writing of host data from the host 110 and/or DRAM 150 to the specified NAND address in the memory 140 as the result of receiving NAND write commands based on the host write command. In yet another example, a garbage collection activity may be internally performed by the control and configuration function within the SoC controller 130 causing multiple read, write and erase NAND commands to be issued to the NAND controller 138 in order to perform a garbage collection function.

Applications running on the host 110 generate commands for the SSD 120 to access data stored in the NAND memory 140. Such commands may be read, write and/or deallocate commands. In order to access specific portions of the NAND memory 140, the host commands contain addressing information which the SSD 120 uses to furnish the request from the host 110. The addressing information provided by the host 110 is with respect to Logical Block Address (LBA) within the SSD. The host 110 sends the logical addressing information to the SSD 120 via a host submission queue. When the host commands are received by the SSD 120, the SoC controller 130 maps the LBA to a linear Logical Cluster Address (LCA). Such mapping is performed by the L2P engine 134 as shown in FIG. 1. In some implementations, the mapping from LBA to LCA is performed algorithmically using a predetermined formula and/or look up tables.

After the LCA is determined, the L2P engine 134 maps the LCA to a physical location in the NAND memory 140. Each physical location in the NAND memory 140 is defined by a Media Cluster Address (MCA). The length of the MCA depends on the capacity of the SSD 120 (e.g. 33 bits for a 16 TB SSD). Storage of data in the NAND memory array 140 may not be in any particular order, and so there may not be any pre-determined or algorithmic relationship between the LCA and the MCA in SSD 120. The mapping of LCA to MCA is therefore done by accessing a mapping table stored in the DRAM 150, but the mapping is not fixed and may be changed by updating entries in the mapping table. The mapping table stored in the DRAM 150 is a working copy of a master mapping table stored in the NAND memory array 140. The LCA is used to index into the mapping table to find the MCA entry and for efficiency there is a fixed, algorithmic way to quickly derive the index of an entry in the mapping table from the LCA, which implies the entries are preferably of a common size. However, the value of the common size may vary according to the storage size of the NAND memory array 140. In some implementations, the mapping table is very large and may be approximately ¹⁄₁₀₀₀th the size of the NAND memory 140.

The entries of each mapping table region in the DRAM 150 are arranged in order according to LCA, but the mapping table regions themselves do not need to be in order. Processing of write commands from the host 110, which may over-write existing data, as well as internal processes such as garbage collection within the SSD 120, may result in the need for reallocation of data stored in the NAND memory 140. Such processes may result in a change in MCA address associated with an LCA in a host command, thereby leading to frequent updates to the mapping table in the DRAM 150 during operation of the SSD 120. The mapping table entries also updated when a deallocate command is sent by the host for a range of LBAs. In response to the deallocate command the controller unmaps or invalidates the corresponding LCAs or regions of the mapping table. The mapping table is therefore continually updated when the host commands or activities like garbage collection are processed by the SSD 120.

However as the DRAM 150 is a volatile memory, when the power supplied to the SSD 120 is removed, e.g. when the SSD 120 is shut down, the contents of the DRAM 150 are lost. This is disadvantageous as the mapping table would no longer be available to map an LCA address received from a host to a physical MCA address within the NAND memory 140, thereby leading to errors when processing host commands. Further, due to the large size of the mapping table in the DRAM 150, copying the entire LUT to another portion of the SSD 120, such as to a portion of the NAND memory 140, may not be possible in the short time from when the power is removed from the SSD 120 to when data is lost from the DRAM 150.

Figure 2:
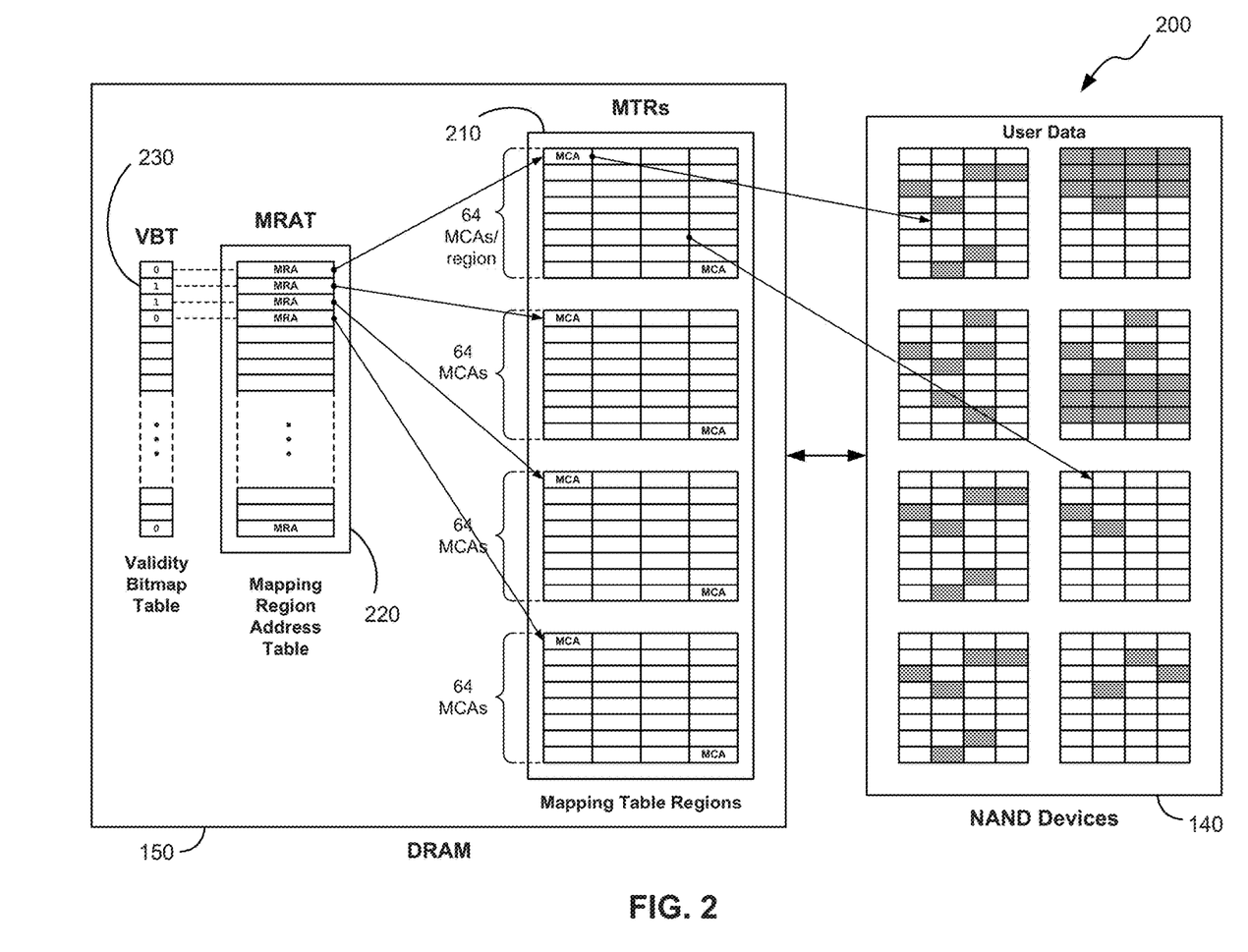
FIG. 2 illustrates the mapping table data structures in the SSD of FIG. 1 and data flow therebetween, according to one or more embodiments of the present disclosure.

FIG. 2 shows the mapping table data structures 200 used during the operation of the SSD, according to an embodiment of the present disclosure. The physical addresses (MCAs) of the NAND memory 140 are shown in FIG. 2, where the NAND memory 140 is grouped in NAND pages. Valid user data is exemplified in the shaded cells, and not all the NAND memory cells contain valid user data. The mapping table 210 is the LCA-MCA mapping table as previously described in relation to FIG. 1. The mapping table 210 may be divided into regions of LCAs, such as, for example, 64 LCAs. Each region is populated with pointers to the physical addresses (MCAs) of the NAND memory cells in the NAND devices. The size of each MCA address is 4 bytes and so the size of each region is 256 bytes. Since each MCA points to 4 KB of user data, each region represents 256 KB of user data. The allocation of NAND cells to the different LCAs of the mapping table 210 may be allocated by the controller.

When all the LCAs in the mapping table region contain pointers to user data stored in the NAND memory 140, all the LCAs in the region will contain valid physical addresses of the respective NAND memory cells containing said user data. However NAND memory cells which have been deallocated or recently erased will not contain any user data. Such NAND memory cells are left unmapped in the mapping table 210, and the LCA pointers stored in the mapping table 210 for these unmapped NAND memory cells will point to an invalid signature address. The invalid signature address is predetermined by the controller firmware, and may be the same throughout the SSD 120. As such the pointers in the mapping table 210 may point to valid addresses in the NAND memory 140 or to the invalid signature address. Thus the various regions in the mapping table 210 may be populated (i) entirely with valid NAND addresses (in the case where the pointers point to user data stored in the NAND memory 140), (ii) entirely with invalid signature addresses (in the case where the NAND memory cells are unmapped and contain no user data), or (iii) may be a mix of (i) and (ii).

It should be noted that when a deallocate command is received from a host, the controller may send a deallocation status completion to the host while utilizing a deallocate flag bitmap (DFB) to manage the processing of the deallocation of the mapping table entry in background within the SSD. The use of the DFB is described in detail in U.S. patent application Ser. No. 17/491,123 filed on Sep. 30, 2021 entitled "SSD Supporting Deallocate Summary Bit Table and Associated SSD Operations," the contents of which are hereby incorporated herein in entirety.

Each region of the LCA-MCA mapping table 210 is assigned a physical address in the NAND memory, termed a media region address (MRA), where the regions were last saved in the NAND during mapping table flush. As shown in FIG. 2, the SSD controller 130 maintains a mapping region address table (MRAT) 220 which contains the MRA of each region of the mapping table 210. The MRAT 220 is therefore a mapping table that is populated with pointers to the physical address for each region of the LCA-MCA mapping table 210. In order to distinguish between regions in the mapping table 210 that are populated entirely with invalid signature addresses and regions populated with at least one valid mapped NAND address, the controller 130 maintains a validity bit for each region of the mapping table 210.

The validity bitmap table comprises a single validity bit for each region, the status of which represents the mapped contents of the region in the mapping table 210. Here the controller assigns the single validity bit to each MRA in the MRAT 220. The bit value indicates whether the respective region in the mapping table 210 contains at least one valid MCA pointing to user data in the NAND devices 140. If the region contains at least one valid MCA, the bit is set to dirty, i.e. set to '1', and if the region is completely unmapped and contains no user data stored in the NAND memory 140, the bit is cleared, i.e. set to '0'. The controller 130 stores the validity bitmaps in a validity bit table (VBT) 230 which is stored in the DRAM 150 for quick access. Since each bit in the VBT represents 256 KB (i.e. the 64 LCAs per region), the size of the VBT 230 is smaller than the size of the drive by a proportion of 1 bit versus 256 KB i.e. 1:(2048×1024). For example, a 0.5 MB VBT 230 would be sufficient for a 1 TB SSD, a 1 MB VBT 230 would be sufficient for a 2 TB SSD, a 2 MB VBT 230 would be sufficient for a 4 TB SSD, a 4 MB VBT 230 would be sufficient for a 8 TB SSD, and a 8 MB VBT 230 would be sufficient for a 16 TB SSD.

As the VBT 230 uses one bit per region to indicate if the region is mapped or unmapped, the write amplification is also significantly reduced in the ratio of 1:(256×8), i.e. 1:2048 times for unmapped regions. Consequently, the time for loading of an LCA-MCA mapping table 210 from the NAND memory devices 140 to the DRAM 150 will also be decreased by that proportion. Further, the write amplification for the unmapped regions will also decrease by that proportion by saving only the mapped dirty regions to the NAND as indicated by the VBT 230 instead of saving all dirty tables, each of size 256 bytes to the NAND, when flushing the mapping table to the NAND. This will provide significant reduction in write amplification and boot time during deallocate intensive workloads. The VBT 230 will also significantly increase sequential and random write I/O per second (IOPS) after a format command is received and during a write and deallocate operation by not writing the unmapped regions of the NAND devices 140 during regular metadata journaling.

In some embodiments, the controller 130 divides the VBT into various sections to be stored in the NAND devices 140 when the updated mapping regions of the mapping table 210 are flushed to the NAND devices 140. To facilitate this, the controller 130 creates a validity bit address table (VBAT) containing the physical addresses in which the VBT sections are written after being flushed to the NAND devices 140. By periodically writing the VBT to the non-volatile memory 140, the validity status of the regions of the LCA-MCA mapping table 210 is saved and can be quickly restored to the DRAM 150 after a power loss event and/or unsafe shut down.

Figure 3A:
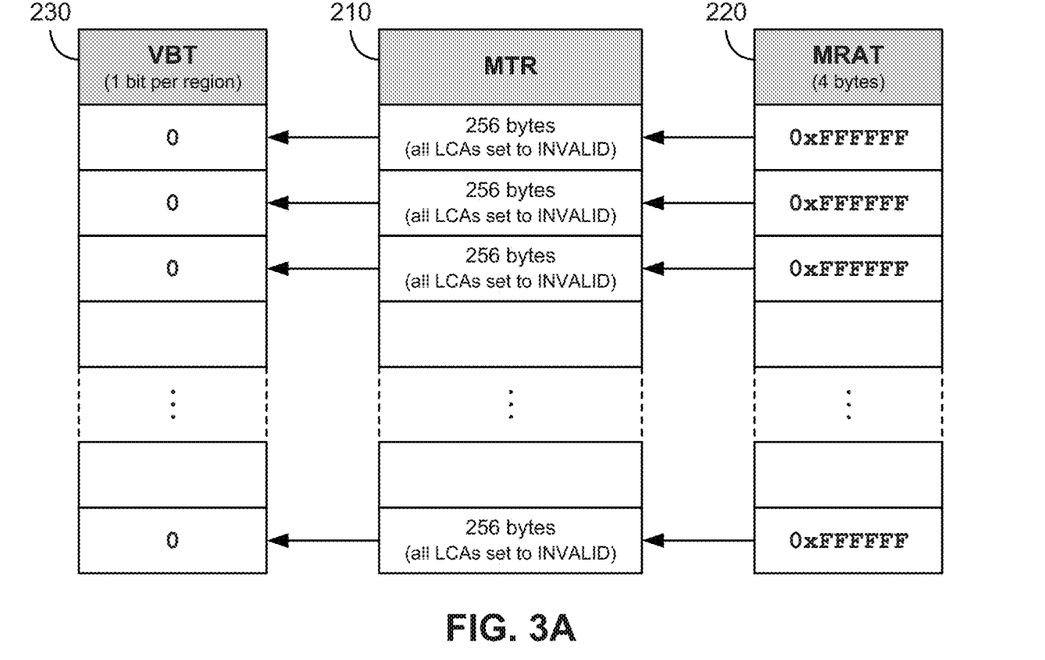
FIG. 3A illustrates the contents of the mapping table data structures of FIG. 2 during initialization of the SSD in FIG. 1, according to one or more embodiments of the present disclosure.

FIG. 3A shows the contents of the LCA-MCA mapping table 210, the MRAT 220 and the VBT 230 during initialization of the SSD 120 during power up. Here the entries in the mapping table 210 are all set to the invalid signature address, exemplified in FIG. 3A as 0xFFFFFFFF. The invalid signature address is predetermined and may be programmed by writing to the controller firmware, for example. Similarly the entries in the MRAT 220 are also set to the invalid signature address and all bits of the VBT 230 are cleared to '0'. Further, according to an embodiment of the present disclosure, the invalid signature address is also used in entries of the MRAT when the corresponding region of the mapping table 210 contains only unmapped MCAs indicating the corresponding LCAs of the mapping table contain no user data, which occurs when processing a deallocate command. This ensures that the unmapped regions are not moved to a new mapping table block during garbage collection. The use of the invalid signature address in this way also reduces write amplification and increases write performance by informing the controller of the validity status of the regions in the mapping table and not writing invalid regions to the NAND during regular metadata journaling.

Figure 3B:
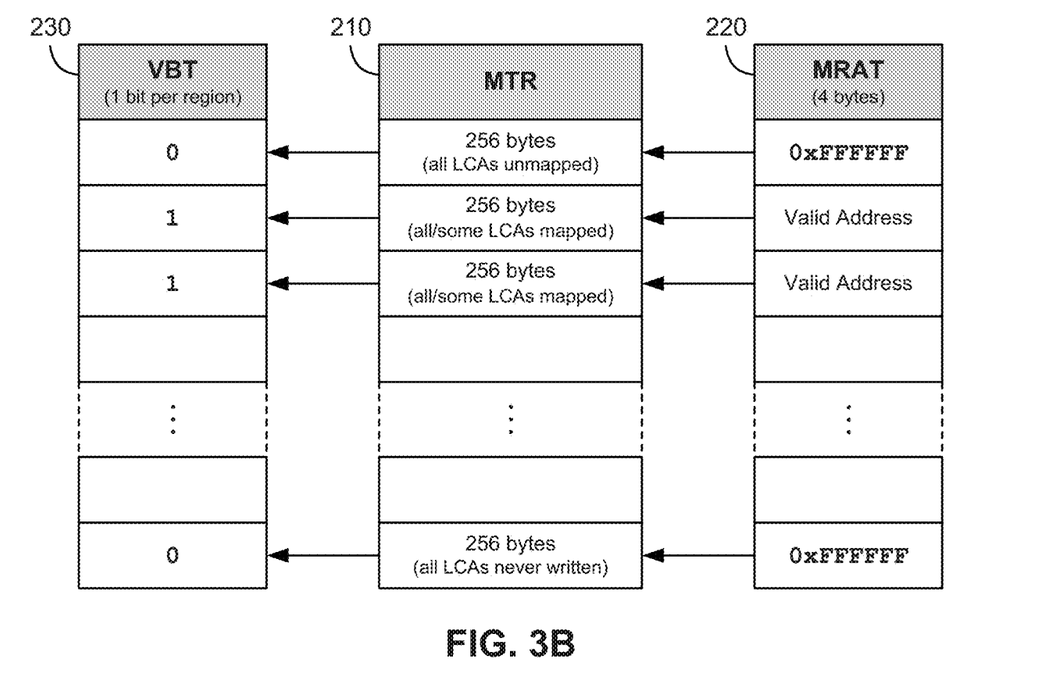
FIG. 3B illustrates the contents of the mapping table data structures of FIG. 2 after processing several host write and deallocate commands, according to one or more embodiments of the present disclosure.

FIG. 3B shows the contents of the LCA-MCA mapping table 210, the MRAT 220 and the VBT 230 after processing some write and deallocate commands from a host. In this case some or all of the LCAs in a region of the mapping table may contain user data, and, correspondingly, the LCAs in the said region store the valid MCAs at which the user data is stored. Accordingly, the MRAT 220 stores the physical address of the regions containing user data, while the remaining MRAT entries default to the signature invalid address to reflect unmapped regions of the mapping table. Further, the controller 130 sets the VBT entries to '1' for regions containing pointers to valid MCAs containing user data, and '0' for regions that are completely unmapped or invalid (e.g. regions that are unmapped by a deallocate command or the regions that have never been written). Here the MRAT 220 contains invalid addresses for unmapped regions in the NAND devices 140, and so these unmapped regions would not be loaded to the DRAM 150 during normal boot following a safe shutdown, and during background or on-demand loading.

Figure 4:
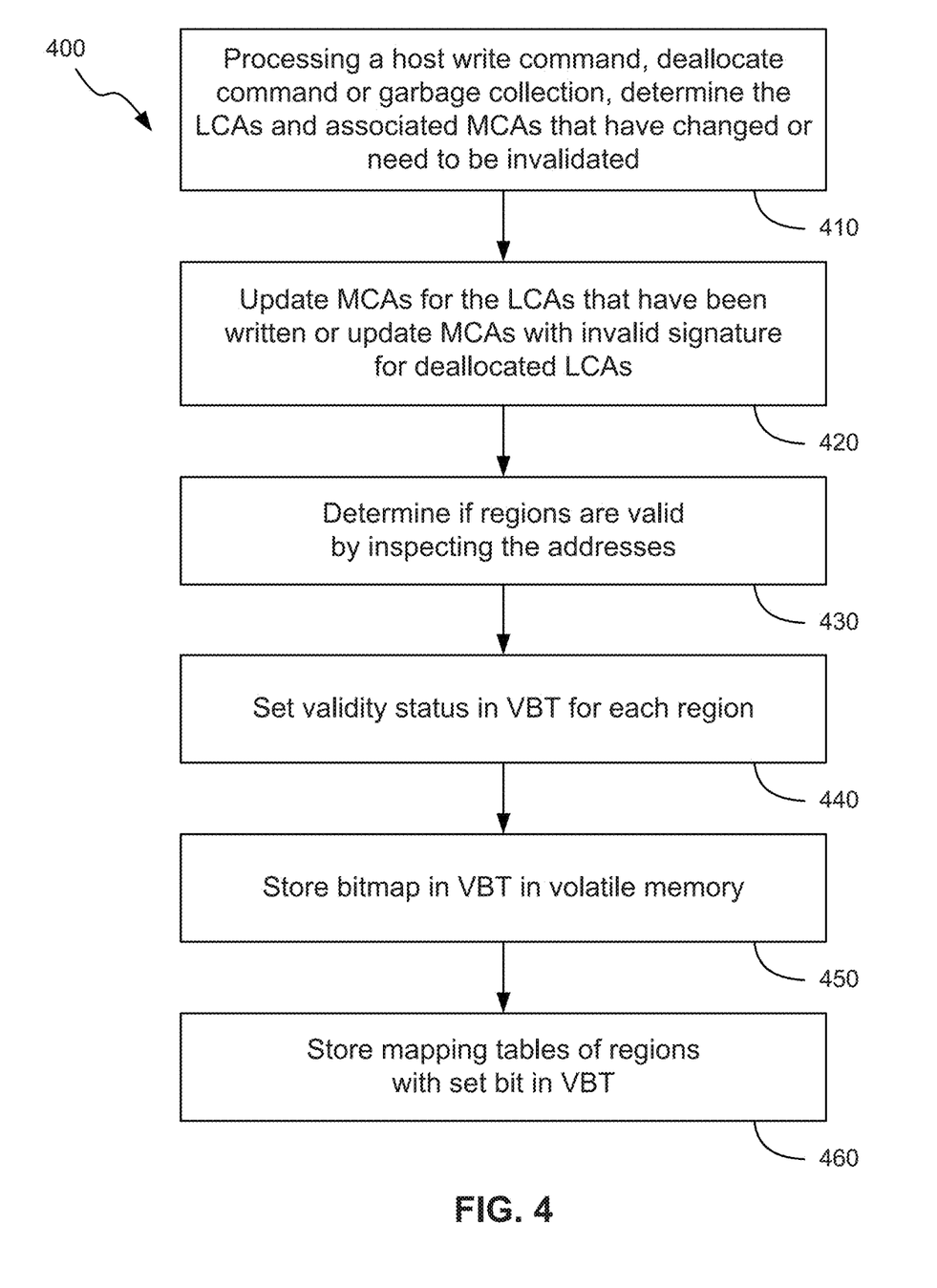
FIG. 4 is a flow diagram of a method for updating an LCA-MCA mapping table stored in a non-volatile semiconductor storage device using a validity bitmap table, according to one or more embodiments of the present disclosure.

FIG. 4 illustrates an exemplary flow diagram of a method 400 for updating an LCA-MCA mapping table stored in a non-volatile semiconductor storage device using a validity bitmap table, according to one or more embodiments of the present disclosure. The method 400 may be carried out with the SSD 120 as described in the foregoing. At first, the LCA-MCA mapping table 210 is loaded into the DRAM 150 of the SSD 120 for access by the controller 120 during background table load or when processing commands from the host. At step 410, when processing host write command, deallocate command or garbage collection, the controller 130 shall determine the LCAs and associated MCAs that have changed or need to be invalidated. In step 420, the controller 130 updates the mapping table to map the MCAs in the NAND devices 140 to LCAs in the logical space and also inserts invalid signature address for deallocated LCAs.

In step 430, the controller 130 then determines if there are any invalid addresses that have been mapped in the mapping table 210. Here invalid addresses are LCAs that have been either unmapped by a previous deallocate command, for example, or LCAs that have never been written. If the LCAs are never written, it will contain invalid MCA addresses as initialized during boot up. If the LCAs are deallocated, it will contain an invalid signature address for those MCAs. The controller then determines a region is invalid if it is only populated by all invalid addresses, otherwise the region is valid.

In step 440, the controller 130 then sets the validity status in a validity bit for each region in a validity bitmap table (VBT) 230 where a '1' is designated for valid regions of the mapping table 210, and a '0' is designated for invalid regions of the mapping table 210. The controller may store the VBT 230 in volatile memory such as the DRAM 150 (step 450). In some implementations, the entries in the VBT 230 are periodically flushed to the NAND memory devices 140 via a validity bitmap address table (VBAT) to assist with VBT restoration after a sudden power loss. In step 460, the controller 130 reads the validity bit from the VBT 230 for the regions of the mapping table 210 and flushes only the dirty regions (i.e. the regions in which the bit is '1') to the NAND devices 140. Flushing to the NAND devices 140 takes place periodically during operation of the SSD 120.

Figure 5:
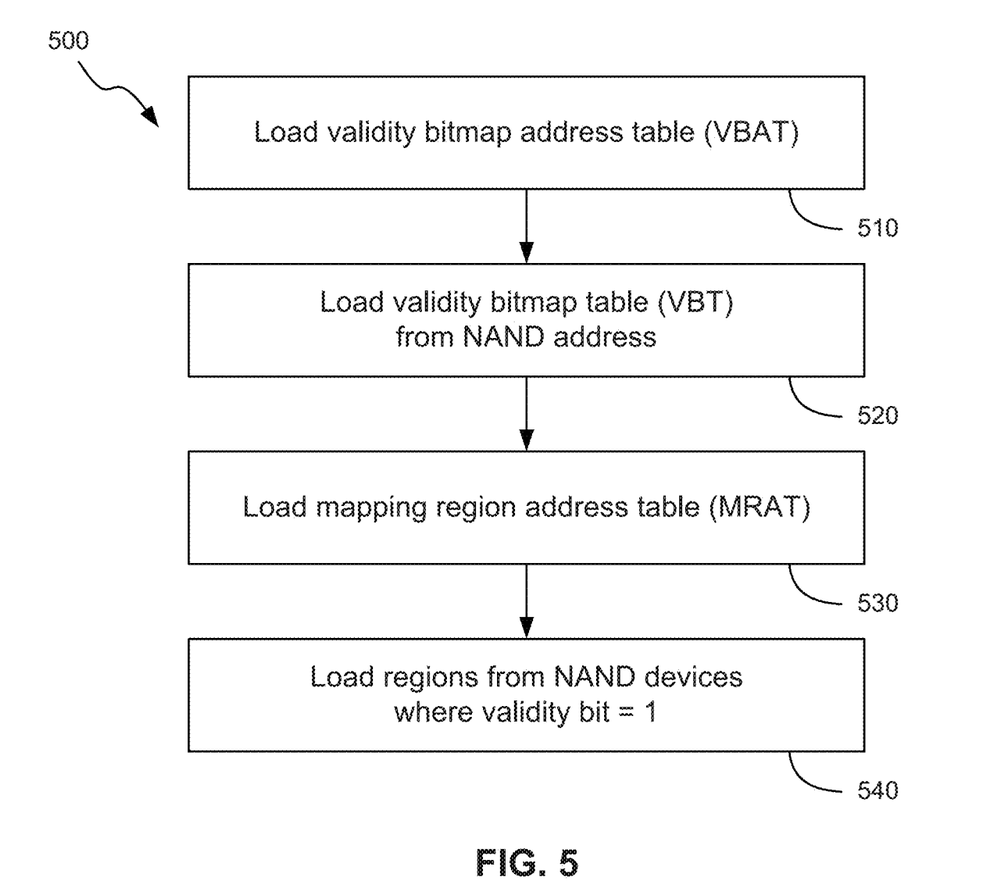
FIG. 5 is a flow diagram of a method for restoration of a mapping table after boot of the SSD following safe shutdown.

FIG. 5 illustrates an exemplary flow diagram of a method 500 for restoration of an LCA-MCA mapping table 210 after boot of the SSD 120 following safe shutdown. Method 500 assumes that the controller 130 has saved sections of the VBT 230 in the NAND memory devices 140 via a validity bitmap address table (VBAT), and that the SSD 120 has been safely shut down prior. The method begins at step 510 where the controller 130 loads the VBAT from the NAND memory devices 140. The VBAT contains pointers to physical address within the NAND memory that contains sections of the VBT 230. The controller 130 then loads the sections of the validity bitmap table from the physical address in step 520, and the MRAT 220 from the NAND memory devices 140 in step 530. For entries in the VBT 230 with dirty bits, i.e. bit set to '1', the controller retrieves the mapping tables corresponding to the valid regions from the relevant physical address as stored in the MRAT. In this manner the valid region of the mapping tables are restored and loaded to the DRAM 150.

Figure 6:
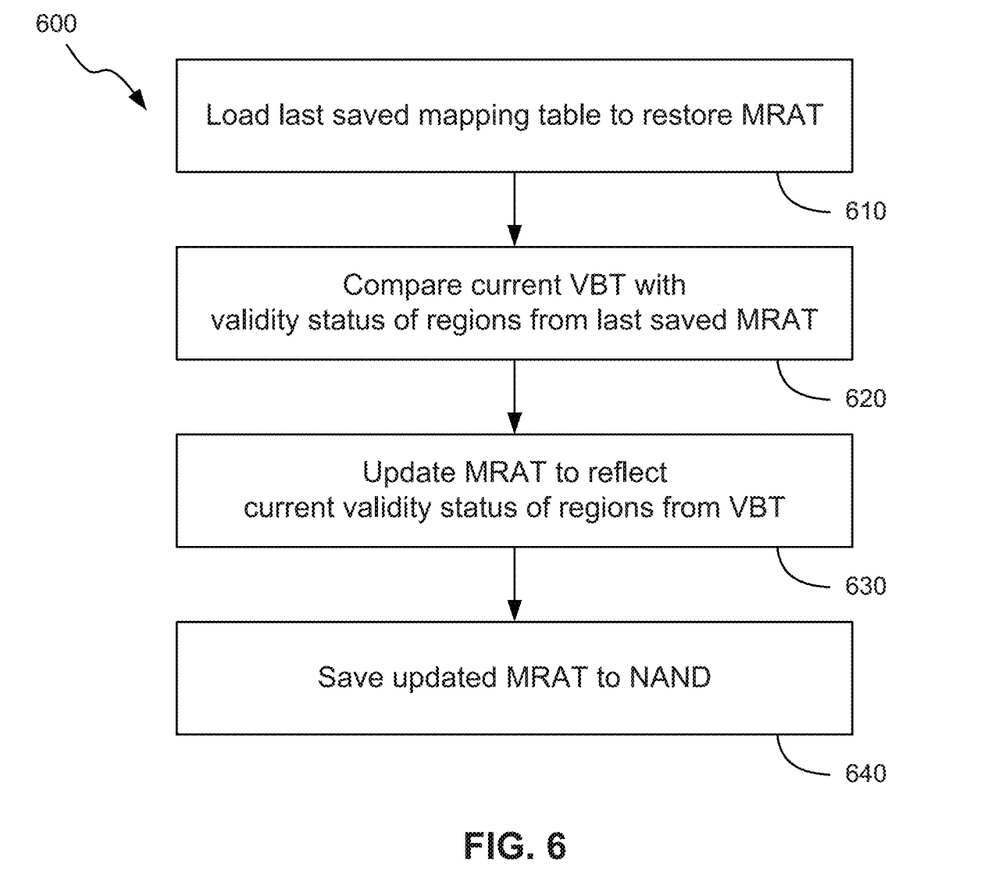
FIG. 6 is a flow diagram of a method for restoration of a mapping table after boot of the SSD following unsafe shutdown.

FIG. 6 illustrates an exemplary flow diagram of a method 600 for restoration of an LCA-MCA mapping table 210 after boot of the SSD 120 following unsafe shutdown. Method 600 assumes that the SSD 120 has unexpectedly shut down and that the controller is now attempting to restore the LCA-MCA mapping table 210 from the previous version saved in the NAND memory devices 140 using the most recent validity status stored in the VBT 230 stored in the NAND during last flush. The method 600 begins at step 610 where the controller loads the last saved mapping table 210 from the NAND memory devices 140 to the DRAM 150. The controller 130 then restores the MRAT 220 from the last saved mapping table 210. The controller then loads the VBT 230 from the NAND memory devices 140 and compares the most recent VBT with the validity status of the regions from the last saved MRAT 220 (step 620). Next in step 630, the controller 130 invalidates regions of the mapping table 210 in which the current version of the VBT 230 identifies as invalid. Here the controller updates the MRAT 220, which is now in the DRAM 150, with the invalid signature address at the entries corresponding to the regions identified by the VBT 230 as invalid. After all the tables are restored, the controller 130 then issues a flush to save the updated tables back to the NAND memory devices 140 in step 640.

In the foregoing, all recitation of "layer" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid-state drive (SSD), comprising:
    splitting a logical to physical mapping table in a non-volatile semiconductor memory device of the SSD into a plurality of regions, each of the regions associated with a plurality of logical cluster addresses (LCAs);
    determining if the logical to physical mapping table for each region contains an entry with a valid address; and
    setting a validity status of a region of the plurality of regions if the logical to physical mapping table for the region contains any mapped addresses.

2. The method of claim 1, wherein an unmapped address is assigned a predetermined value.

3. The method of claim 1, wherein the non-volatile semiconductor memory device is a NAND semiconductor memory.

4. The method of claim 1, wherein the validity status comprises a validity bit.

5. The method of claim 4, further comprising:
    storing the validity bit for each region in a validity bitmap table (VBT).

6. The method of claim 5, further comprising:
    associating a physical address with the logical to physical mapping table for each region;
    storing the physical address for each region in a mapping region address table (MRAT); and
    storing the MRAT in the non-volatile semiconductor memory device.

7. The method of claim 6, further comprising:
    storing a physical address for the validity bit for each region in a validity bitmap address table (VBAT); and
    storing the VBAT in the non-volatile semiconductor memory device.

8. The method of claim 7, further comprising:
    in response to a boot up command, loading the VBAT and MRAT from the non-volatile semiconductor memory device;
    determining the validity status of the plurality of regions from the VBT; and loading to a volatile semiconductor memory device using the MRAT, the logical to physical mapping tables for the regions containing valid addresses.

9. The method of claim 7, further comprising:
in response to unsafe shutdown or loss of power, loading a last saved version of the MRAT from the non-volatile semiconductor memory device;
loading current version of the VBT from a volatile semiconductor memory device;
comparing the validity status of the plurality of regions in the current version of the VBT with the validity status of the plurality of regions in the last saved version of the logical to physical mapping tables from the MRAT; and
updating an invalid region address in the MRAT to correspond with the validity status of the plurality of regions from the current version of the VBT.

10. The method of claim 8, wherein the volatile semiconductor memory device is a Dynamic Random Access Memory (DRAM).

11. The method of claim 5, wherein the validity status of the validity bit is a single-bit status.

12. The method of claim 11, wherein setting the validity status comprises clearing the validity bit to '0' if a region is completely unmapped, or setting the validity bit to '1' if a region contains at least one valid addresses.

13. The method of claim 5, further comprising:
determining the validity status for a region from the VBT; and
storing the logical to physical mapping table for the region in the non-volatile semiconductor memory device if the region contains valid addresses.

14. The method of claim 5, further comprising:
updating the validity status for the plurality of regions in the non-volatile semiconductor memory device in response to any one of a write command, a deallocation command, a garbage collection command; and
updating the corresponding validity status for each region in the VBT.

15. A solid-state drive (SSD) comprising:
a non-volatile semiconductor memory device configured to store a logical to physical mapping table;
a volatile semiconductor memory device configured to store a validity bitmap table (VBT); and
a controller coupled to the non-volatile semiconductor memory device and the volatile semiconductor memory device, the controller configured to:
split the logical to physical mapping table into a plurality of regions, each of the regions associated with a plurality of logical cluster addresses (LCAs);
determine if the logical to physical mapping table for each region contains an entry with a valid address; and
set a validity status of a region of the plurality of regions if the logical to physical mapping table for the region contains any mapped addresses.

16. The SSD of claim 15, wherein an unmapped address is assigned a predetermined value.

17. The SSD of claim 15, wherein the non-volatile semiconductor memory device is a NAND semiconductor memory.

18. The SSD of claim 15, wherein the volatile semiconductor memory device is a Dynamic Random Access Memory (DRAM).

19. The SSD of claim 15, wherein the validity status comprises a validity bit.

20. The SSD of claim 19, wherein the controller if further configured to:
store the validity bit for each region in the VBT.

21. The SSD of claim 20, wherein the controller is further configured to:
associate a physical address with the logical to physical mapping table for each region;
store the physical address for each region in a mapping region address table (MRAT); and
store the MRAT in the non-volatile semiconductor memory device.

22. The SSD of claim 21, wherein the controller is further configured to:
store a physical address for the validity bit for each region in a validity bitmap address table (VBAT); and
store the VBAT in the non-volatile semiconductor memory device.

23. The SSD of claim 22, wherein in response to a boot up command, the controller is further configured to:
load the VBAT and MRAT from the non-volatile semiconductor memory device;
determine the validity status of the plurality of regions from the VBT; and
load to the volatile memory using the MRAT, the logical to physical mapping tables for the regions containing valid addresses.

24. The SSD of claim 22, wherein in response to unsafe shutdown or loss of power, the controller is further configured to:
load a last saved version of the MRAT from the non-volatile semiconductor memory device;
load current version of the VBT from the volatile semiconductor memory device;
compare the validity status of the plurality of regions in the current version of the VBT with the validity status of the plurality of regions in the last saved version of the logical to physical mapping tables from the MRAT; and
update an invalid region address in the MRAT to correspond with the validity status of the plurality of regions from the current version of the VBT.

25. The SSD of claim 20, wherein the validity status of the validity bit is a single-bit status.

26. The SSD of claim 25, wherein the validity status is set by clearing the validity bit to '0' if a region is completely unmapped, or setting the validity bit to '1' if a region contains at least one valid addresses.

27. The SSD of claim 20, wherein the controller is further configured to:
determine the validity status for a region from the VBT; and
store the logical to physical mapping table for the region in the non-volatile semiconductor memory device if the region contains valid addresses.

28. The SSD of claim 20, wherein the controller is further configured to:
update the validity status for the plurality of regions in the non-volatile semiconductor memory device in response to any one of a write command, a deallocation command, a garbage collection command; and
update the corresponding validity status for each region in the VBT.

* * * * *